Oct. 11, 1927. 1,645,338
A. B. MODINE
MEANS FOR MAINTAINING THE TEMPERATURE OF THE FLUID
IN CIRCULATING SYSTEMS
Filed July 17, 1920 2 Sheets-Sheet 1
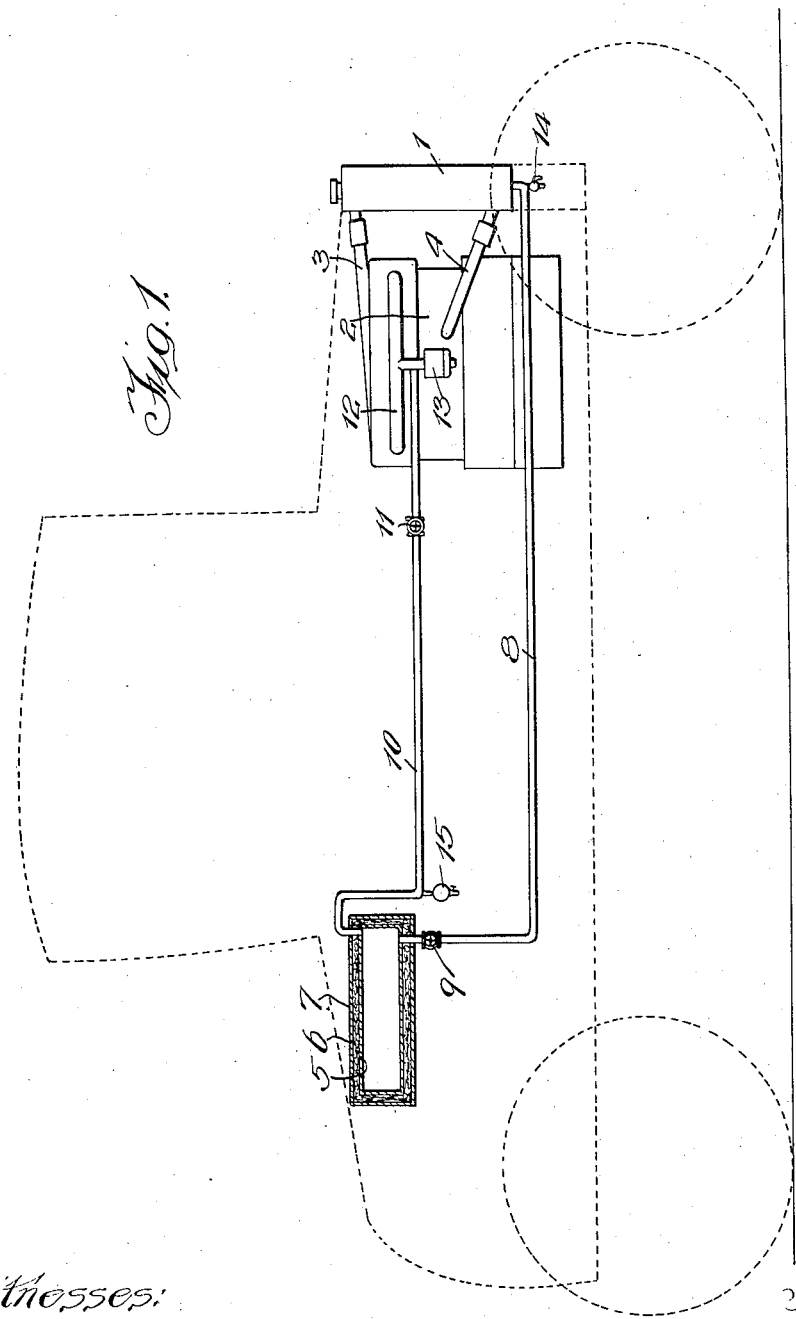

Oct. 11, 1927. 1,645,338
A. B. MODINE
MEANS FOR MAINTAINING THE TEMPERATURE OF THE FLUID
IN CIRCULATING SYSTEMS
Filed July 17, 1920 2 Sheets-Sheet 2
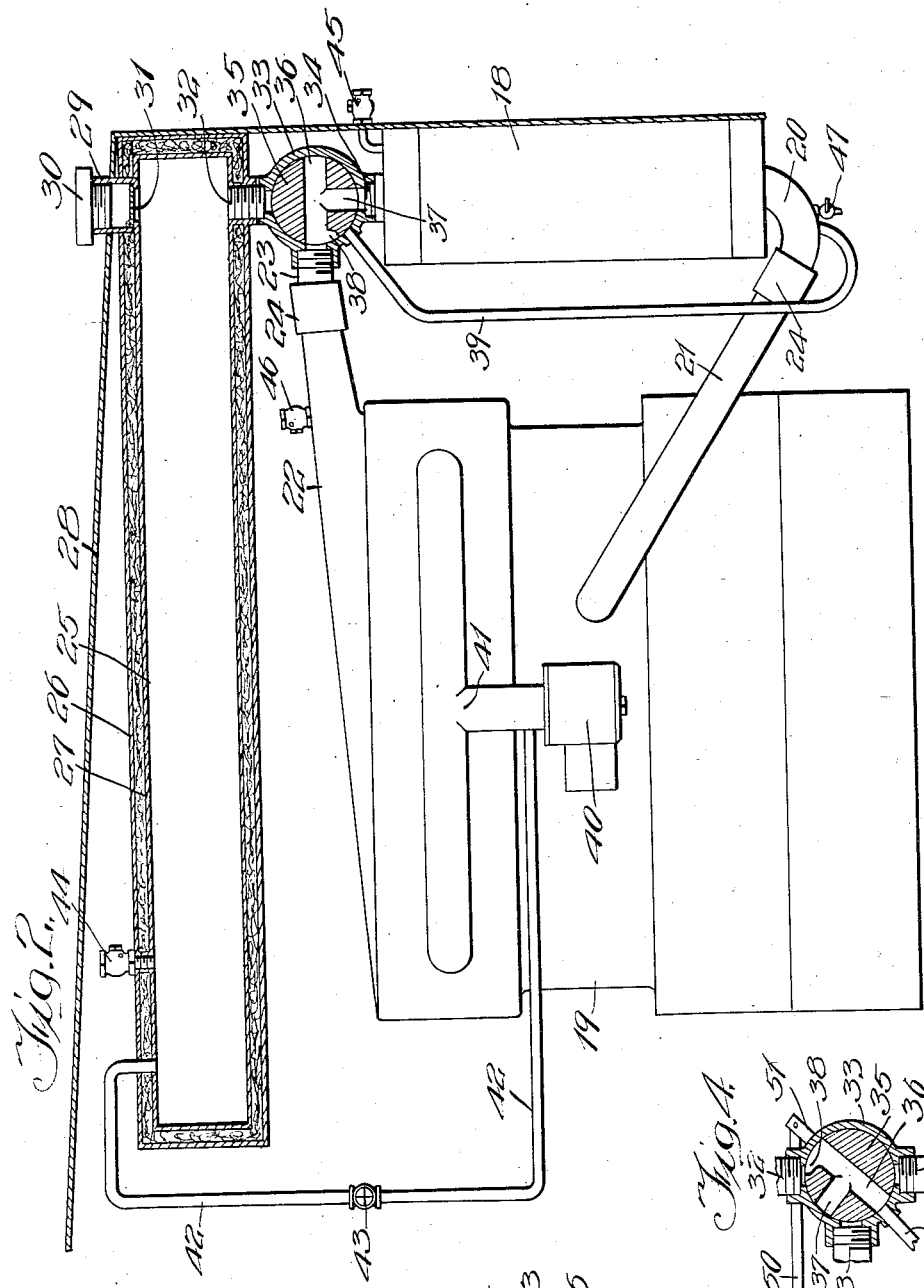
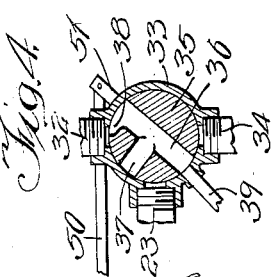
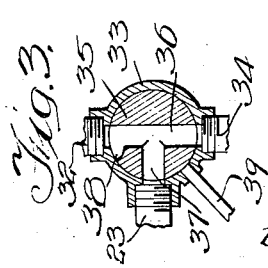

Patented Oct. 11, 1927.

1,645,338

UNITED STATES PATENT OFFICE.

ARTHUR B. MODINE, OF RACINE, WISCONSIN.

MEANS FOR MAINTAINING THE TEMPERATURE OF THE FLUID IN CIRCULATING SYSTEMS.

Application filed July 17, 1920. Serial No. 397,106.

My invention relates to a part of the cooling system for any mechanism where there is a liability of trouble from changes of temperature of the circulating fluid when the mechanism is not in operation, such as internal combustion engines used on passenger automobiles, trucks, tractors and the like. The invention has particularly as an object the production of a simple, convenient, reliable, inexpensive, efficient and satisfactory means of the kind described, for use wherever found applicable. More particularly the invention has among its objects the production of a means or system whereby the circulating fluid may be removed from the system when the mechanism is not in service, and temporarily stored in a protected or insulated receptacle or the equivalent, from which the fluid may be returned to the system without the necessity of pumping or operating the mechanism in order to drive the same back. It has, in addition, the production of a means which will permit the restoring of the fluid to the engine to partially heat the same or warm it up prior to its starting, thereby making possible quick and easy starting. Many other objects and advantages of the construction herein shown and described will be obvious to those skilled in the art from the disclosure herein made.

To this end my invention consists in the novel construction, arrangement and combination of parts herein shown and described, and more particularly pointed out in the claims.

In the drawings, wherein like reference characters indicate like or corresponding parts, Fig. 1 is a view in elevation and part in section of my improved means as applied to an automobile, the automobile being shown in dotted lines;

Fig. 2 is a view in elevation and part in section of my improved means substantially built in the automobile, a complete automobile not being shown; and Figs. 3 and 4 are sectional views through the valve shown in Fig. 2, illustrating the changed positions thereof.

Referring to the drawings, 1 represents what is generally known as a radiator used in connection with an internal combustion engine on passenger automobiles, trucks, tractors and the like, or on any installation in which the combustion engine may be employed. I have shown a gas or internal combustion engine 2, which may be of the desired type and size, and which is connected with the radiator by the connections 3 and 4, or in equivalent manner. The radiator, engine and connections shown represent any installation upon which the same is made, and it is immaterial what fluid is circulated in the system.

Arranged at a convenient point relative the radiator, on an automobile, for example at the rear or at any other convenient point, preferably at a point above the engine, is a tank or receptacle 5 which, in the construction shown, I have covered with an insulating cover 6 and an exterior cover 7. In other words, the tank is so arranged that when the heated cooling fluid is discharged therein, the heat will be retained and not dissipated from the receptacle for as long a period of time as possible. The container or receptacle may be constructed in any suitable manner to accomplish this end, and I prefer to make the same so that should the fluid freeze in the tank 5, no harm would result to the tank. The tank 5 is connected with the radiator by a pipe or conduit 8 of the desired size and material. I prefer to employ a valve 9 at some convenient point so that the fluid when drawn into the receptacle and the valve closed, cannot flow back under any circumstances. The receptacle is also connected by the pipe or conduit 10 of the desired size and material to a suitable part of the engine which will cause a suction or vacuum in the pipe when the engine is running, or to a pump provided for the purpose. As shown, the pipe 10 is connected to the intake manifold pipe between the manifold 12 and the carbureter 13, 11 being a control valve arranged in the pipe. The valve 11 may be of any suitable construction so that passage through the pipe may be prevented and the same may be installed at any desired convenient point. I have also shown a drain cock 14 in the pipe 8, and what may be termed a trap 15 in the pipe 10, it being understood that these may be used or omitted as desired.

The operation of the device may be briefly described as follows: Assuming that the tank 5 is filled with the hot or heated cooling fluid, as for example, water, the valve 9 being closed and the valve 11 being closed or open as the case may be, all of the water being out of the circulating system, to-wit, out of the radiator 1, engine 2, water jackets, connections 3 and 4 and pipe 8. When it is desired to start the engine, valve 9 is operated as well as valve 11, should the same be closed. The fluid in the tank 5 is free to flow by gravity through pipe 8 back into the engine, radiator and connections, air passing through the pipe 10 into the tank 5 and preventing a vacuum. As soon as the water has drained out and into the circulating system, valve 11 and, if desired, valve 9 are closed. The cooling fluid then circulates through the engine and radiator in the usual manner as the engine is driven. Starting of the engine is comparatively easy as the warm or heated cooling fluid has thoroughly warmed up the engine, manifold, etc. When the car is to be stopped on the road or stored in the garage over night, etc., and the weather is such that there is a possible danger of the circulating fluid's freezing up, or it is desired to keep the fluid warm so that the engine may be warmed up before again starting, valve 11 is opened before stopping the engine, valve 9 being opened should the same have been closed. As soon as the valves are open, there is immediately created a vacuum in the tank 5 which causes the water in the circulating system to flow back through pipe 8 and be sucked up into tank 5. The engine may be run as desired and until the fluid has been completely removed from the system and ordinarily at the last the heat of the engine will completely evaporate any moisture on the inside of the engine and the water jacket. As soon as the fluid has been removed from the circulating system, the valves 9 and 11 may be closed. The system may be drained at any time through the drain cock 14, as desired. The trap 15 may be employed if found desirable so that any water or sediment that might be accidentally drawn up through pipe 10 may be entrapped and drawn off as desired. Ordinarily the driver of the car, truck or tractor may withdraw the fluid before the stopping time, for example, in the case of a passenger car, before reaching the garage, so that all of the fluid has had an opportunity to be drawn out of the circulating system. Should the fluid in the tank 5 become chilled enough to freeze, the worst that the same could do would be to injure the tank 5, which, however, is preferably constructed to avoid just such an occurrence. In case tank 5, however, was injured, the same could be repaired more easily than could the radiator or engine. It will be particularly noted that with the present described apparatus that, while the fluid is drained from the system by a vacuum, the same is free to flow back by gravity. Consequently it is not necessary to start the engine or to manually pump the same back into the system, and the engine may be warmed up before starting.

In the construction shown in Fig. 2, which is preferred where possible of installation, and which may be built in the automobile at the factory, 18 represents the automobile radiator, and 19 the engine. The radiator and water jacket of the engine are connected by a pipe 20 and a pipe 21 secured respectively to the engine and radiator, and by a conduit 22 connected to a pipe 23 which is connected to the radiator and with an insulated tank, as will be described. The pipes may be connected by suitable couplings 24, or the equivalent. Preferably arranged under the hood 28 of the automobile, connected with radiator 18, is the storage tank 25, which in the construction shown is provided with an outer jacket 26. I also preferably provide heat insulating material 27, between 25 and 26, for retaining the heat of the contents in the tank 25. Tank 25 is preferably provided with a filler pipe 29, covered by the usual cap 30 and with a valve 31, of any suitable type which may be opened outwardly for filling or if necessary to permit the escape of steam. Tank 25 is provided with port 32 which is connected with the casing 33, having a port 34 connected with the radiator and a port connecting with the pipe 23, as well as a port connected with pipe 39. Arranged within the casing 33 is a valve member 35, which in the construction shown is provided with ducts or passage-ways 36 and 37, one end of the duct 36 being preferably enlarged as at 38. There is also connected to the casing 33, a pipe or conduit 39, which preferably extends to the lowest part of the system, as for example, in the case shown, to the pipe 20 from the radiator.

The engine is provided with the usual carbureter 40, connected with the intake manifold 41, to which is connected a pipe 42 connected with the tank 25. There is also provided a valve 43, which in the preferred construction may be operated from the inside of the automobile. I also prefer to provide a relief valve 44 arranged to open outwardly and vent valves 45 and 46 arranged to open inwardly. If desired there may also be provided a pet-cock 47 and such other valves, traps, screens, etc., as may be desired. The valve 35 may be operated when the system is installed in an automobile, from the seat of the automobile in any suitable manner, for example, by means of the lever 51, secured to the valve and rod 50, extended up to a point convenient for operation by the driver. Ordinarily the valve 43 is not necessary, but the same may be employed if desired and if a lever type of valve is employed it may be connected with the rod 50.

The operation of this type of apparatus may be briefly described as follows: Assuming that the system is empty. Water or the cooling fluid may be poured into the filler opening or pipe 29, the valve 31 having been opened, the same flows into the tank 25 filling the same. The tank 25 should be of sufficient capacity to hold the full amount of water required for cooling and is preferably of a size so that the same is not entirely filled when the circulating water is contained in the same. If the valve 35 is then turned, as indicated in Fig. 3, water can flow into the system through the duct 36 and 37, thereby filling the system with the cooling fluid, both in the radiator and in the water jacket of the engine. Valve 35 is then preferably turned to the position shown in Fig. 2. The engine may then be run in the usual manner. When it is desired to draw the water from the system into the tank, valve 35 is preferably turned, as substantially indicated in Fig. 4, and valve 43, if closed, opened. A vacuum is then created in the tank 25, by virtue of the connection of pipe 42 with the intake manifold, or the equivalent pumping mechanism. The vacuum, however, is relieved through the pipe 39 and duct 36, the cooling fluid in the system being drawn up through pipe 39, valve 35, into tank 25, until the system is entirely emptied. Valves 35 and 43 may then be closed, the heated fluid being retained in the tank 25 as long as desired, the tank being preferably so constructed that it will not be injured, even through the temperature should drop below the freezing point. As the water is withdrawn from the system, a vacuum is prevented from being formed therein by the admission of air through the relief valves or automatic vents 45 and 46. Ordinarily the water will retain its temperature for a considerable period of time, so that the driver may withdraw the water either in the garage or on the street, as previously described, permitting the car to stand in the cold. When it is desired to start the car, the hot or warm fluid may be discharged into the system by opening the valve 35, as previously described, the same flowing by gravity. Not only is the engine prevented from freezing up, but the hot or warm discharge fluids will make the starting easy at all times. It may be mentioned that any type of radiator desired may be employed, that shown being merely illustrative and any suitable means may be provided for pumping the fluid or drawing it up into the tank 25.

Having thus described my invention, it is obvious that various immaterial modifications may be made in the same without departing from the spirit of my invention; hence I do not wish to be understood as limiting myself to the exact form, arrangement, construction and combination of parts herein shown and described or uses mentioned.

What I claim as new and desire to secure by Letters Patent is:

1. In a device of the kind described, an internal combustion engine and cooling system comprising a water jacket for the engine and a radiator for containing and directing a fluid to and to receive the same from the water jacket, said cooling system including a conduit leading from the upper part of the water jacket, in combination with a receptacle arranged directly above the engine and cooling system, a connection leading from the receptacle connected to the upper part of the radiator and to the said conduit whereby fluid in the receptacle may feed by gravity into the system, means connected with said motor whereby a vacuum is produced in the receptacle for causing the fluid to flow from the system into said receptacle, means for admitting air to the system during the withdrawal of the fluid therefrom, and manually controlled means for controlling the passage of fluid to and from the receptacle, said last mentioned means including a valve interposed in said connection adapted to alternately establish communication between the upper part of the radiator and said conduit alone, and between the upper part of the radiator, the conduit and the receptacle.

2. In a device of the kind described, an internal combustion engine and cooling means comprising a water jacket for the engine and a radiator for containing and directing a fluid to and to receive the same from the water jacket, said cooling system including a conduit leading from the upper part of the water jacket, in combination with a receptacle arranged directly above the engine and cooling system, a connection leading from the receptacle connected to the upper part of the radiator and to the said conduit whereby fluid in the receptacle may feed by gravity into the system, means connected with the motor whereby a vacuum is produced in the receptacle for causing the fluid to flow from the system into the receptacle, a pipe connection leading from the lower part of the cooling system to said connection, means for admitting air to the system during the withdrawal of the fluid therefrom, and manually controlled means for controlling the passage of fluid to and from the receptacle, said last mentioned means including a valve interposed in said connection adapted to establish communication between the upper part of the radiator and said conduit alone, or between the upper part of the radiator, the conduit and the receptacle, or between the said pipe connection and the receptacle alone.

In testimony whereof, I have hereunto signed my name.

ARTHUR B. MODINE.